R. H. COMSTOCK.
PLANT SUPPORT.
APPLICATION FILED JULY 31, 1912.
1,051,390.
Patented Jan. 28, 1913.
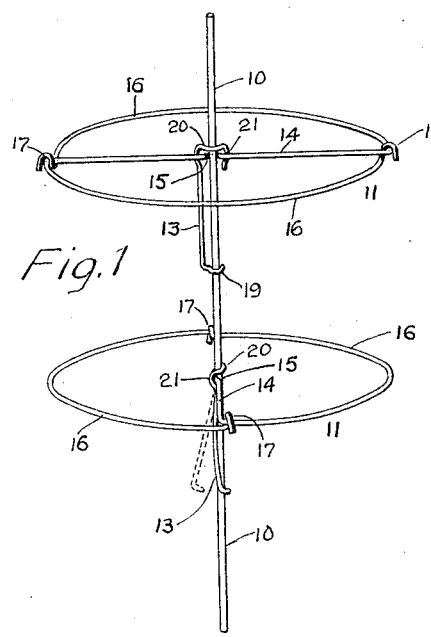
Fig. 1
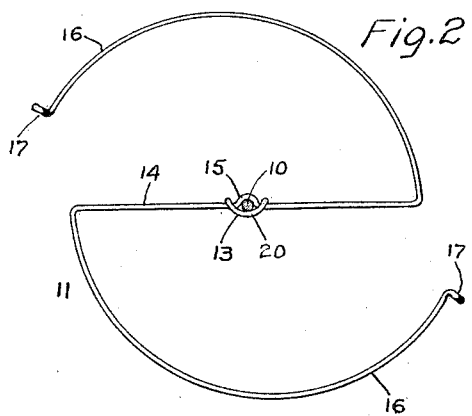
Fig. 2
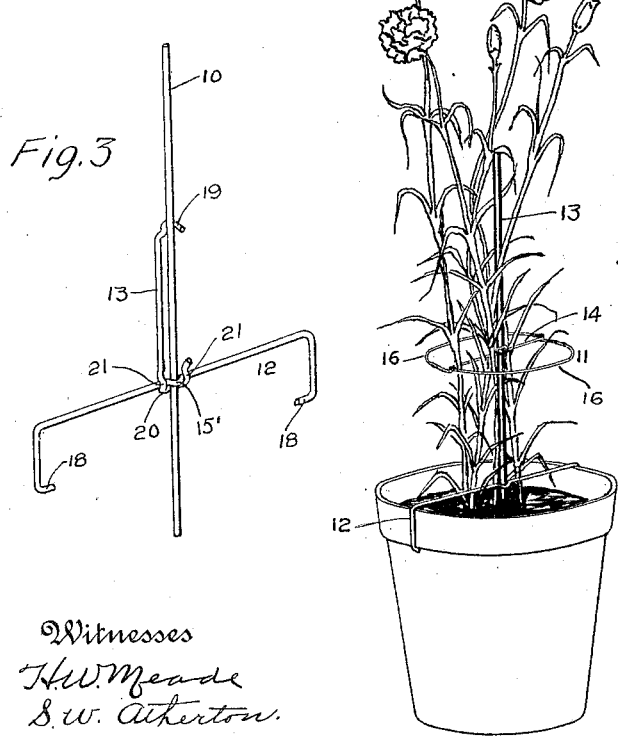
Fig. 3
Fig. 4
Witnesses
H. W. Meade
S. W. Atherton.
Inventor
Roger H. Comstock
by
Attorney

UNITED STATES PATENT OFFICE.

ROGER H. COMSTOCK, OF MILFORD, CONNECTICUT.

PLANT-SUPPORT.

1,051,390.  Specification of Letters Patent. Patented Jan. 28, 1913.

Application filed July 31, 1912. Serial No. 712,429.

*To all whom it may concern:*

Be it known that I, ROGER H. COMSTOCK, a citizen of the United States, residing at Milford, county of New Haven, State of Connecticut, have invented an Improvement in Plant-Supports, of which the following is a specification.

This invention has for its object to provide a simple and inexpensive plant and bush support adapted for general use in pots and beds, which shall be centrally supported and divided into sections, either of which may be opened to permit insertion or removal of plants without bending the plants and which may be easily attached, detached or adjusted.

With these and other objects in view I have devised the novel plant and bush support of which the following description in connection with the accompanying drawing is a specification, reference characters being used to indicate the several parts.

Figure 1 is a perspective view illustrating a two-ring support detached; Fig. 2 a plan view of a ring showing the ends detached to open the sections; Fig. 3 a view showing the use of a brace-rod to support the stake from a pot, and Fig. 4 is a perspective view illustrating the use of my novel support in connection with a plant in a pot.

My novel support comprises a stake 10 ordinarily a rod, one or more rings 11, a brace-rod 12 which may or may not be used in connection with a pot, and clips 13 for attaching the rings and brace-rod to the stake. The ring is made from a single piece of wire and comprises a cross piece 14 having a half-eye 15 at its mid-length and two half-rings 16 connected to opposite ends of and lying on opposite sides of the cross piece, each half-ring being provided at its free end with a hook 17 adapted to engage the intersection of the other half-ring and the cross piece. The brace-rod 12 is provided at its mid-length with a half-eye 15' and at its ends with hooks 18 suitably shaped to engage the flange at the upper edge of a flower pot, as clearly shown in Fig. 4. The clip 13 comprises a shank having at one end a hook 19 which is adapted to engage the stake and at the other end a half-eye 20 and on opposite sides of the half-eye hooks 21.

The mode of fastening rings and brace-rods to the stakes will be clearly understood from the drawing. The ring or brace-rod is placed in the desired position on the stake with the stake lying in the half-eye and then the half-eye on the clip is placed contiguous but facing in the opposite direction, the hooks upon the clip engaging the brace-rod or cross piece on opposite sides of the half-eye therein. The hook 19 at the opposite end of the clip is then sprung into engagement with the stake, as in Figs. 1 and 3. The ring or brace-rod is thereby locked rigidly in place so that it cannot be moved upward or downward without springing hook 19 of the clip out of engagement with the stake. If required to adjust a ring or brace-rod the hook 19 of the clip is disengaged from the stake but without disengaging hooks 21 from the cross piece of the ring or the brace-rod. The ring or brace-rod may then be adjusted to the required position and locked there by again springing hook 19 into engagement with the stake, the resiliency of the clip causing the contiguous and oppositely faced half-eyes to grip the stake tightly.

It is an important feature of the present invention that it is centrally attached to the stake and does not have to be detached therefrom to place plants within the ring or to remove them therefrom, as one end of either half-ring may be detached and the section opened out without interfering with the other section or the attachment of the ring to the stake. This makes it unnecessary to bend the plant at all. The dividing of the ring into sections is also a valuable feature as it enables the operator to remove a portion of a bush or plant from the ring for treatment or for any purpose whatever, leaving the other portion firmly supported. Should it be desirable at any time to support a plant in four sections instead of two, the desired result may be obtained by placing one ring above another with the cross pieces at right angles to each other. They may be placed close together if preferred or at a distance apart, as in Fig. 1.

Having thus described my invention I claim:

1. A plant support comprising a stake, a ring having a cross piece by which it is divided into sections and means for connecting the mid-length of the cross piece to the stake.

2. A plant support comprising a stake, a ring consisting of a cross piece and two half-rings, each provided at its free end with a hook adapted to engage the intersection of the cross piece and the other half-ring, and means for connecting the cross piece to the stake.

3. A plant support comprising a stake, a ring having a cross piece with a half-eye at its mid-length adapted to receive the stake, and a clip comprising a half-eye adapted to receive the stake, hooks on opposite sides of the half-eye adapted to engage the cross piece and a hook adapted to be sprung into engagement with the stake.

4. A ring of the character described comprising a cross piece having a half-eye at its mid-length and half-rings connected to opposite ends of the cross piece and having at their free ends hooks adapted to engage the intersection of the cross piece and the other half-ring.

5. A ring of the character described comprising a cross piece and half-rings connected to opposite ends of the cross piece, the other ends of the half-rings detachably engaging the intersections of the cross piece and half-rings.

6. A plant support comprising a stake, a ring comprising a cross piece and half-rings connected at one end to the cross piece and provided at their other ends with means for detachably engaging the intersections of the cross piece and half-rings and means for connecting the cross piece to the stake.

7. A plant support comprising a stake, a ring having a cross piece with a half-eye to receive the stake, a brace-rod having hooks at its ends and a half-eye to receive the stake and clips having half-eyes to receive the stake, hooks on opposite sides of the half-eye, for the purpose set forth, and other hooks adapted to be sprung into engagement with the stake whereby the ring and brace-rod are locked in place.

8. A plant support comprising a stake, a ring having a cross piece with a half-eye to receive the stake, a brace-rod having a half-eye to receive the stake, and means for detachably securing the cross piece and brace-rod to the stake.

In testimony whereof I affix my signature in presence of two witnesses.

ROGER H. COMSTOCK.

Witnesses:
A. M. WOOSTER,
S. W. ATHERTON.

Copies of this patent may be obtained for five cents each, by addressing the "Commissioner of Patents, Washington, D. C."